June 3, 1930.  C. DOERING ET AL  1,761,010
BUTTER CUTTING MACHINE
Filed April 29, 1926   5 Sheets-Sheet 1

June 3, 1930.  C. DOERING ET AL  1,761,010
BUTTER CUTTING MACHINE
Filed April 29, 1926    5 Sheets-Sheet 2
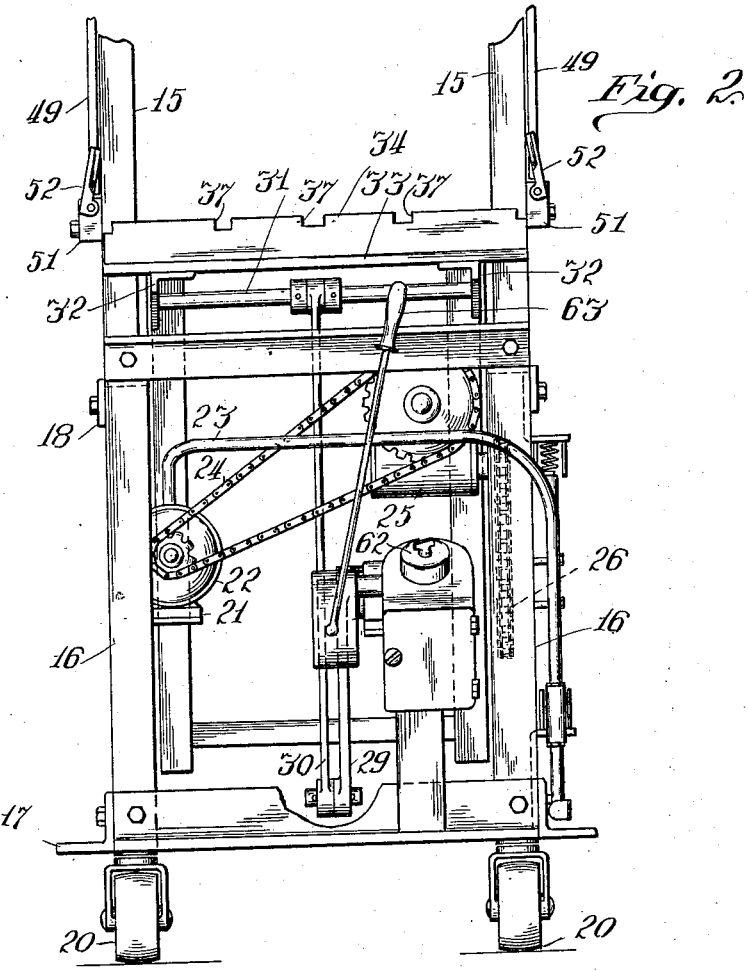
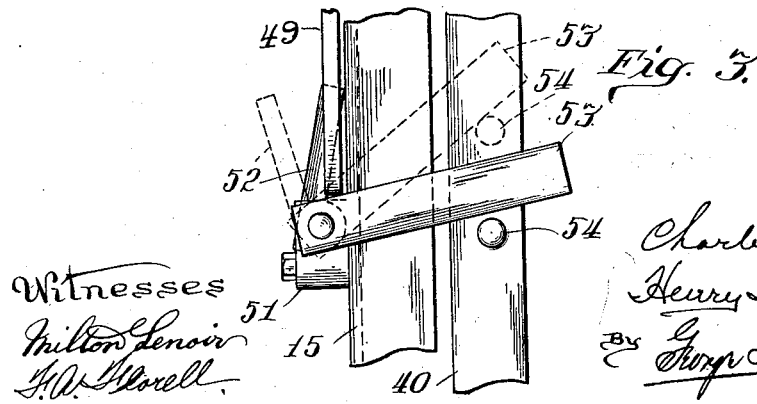

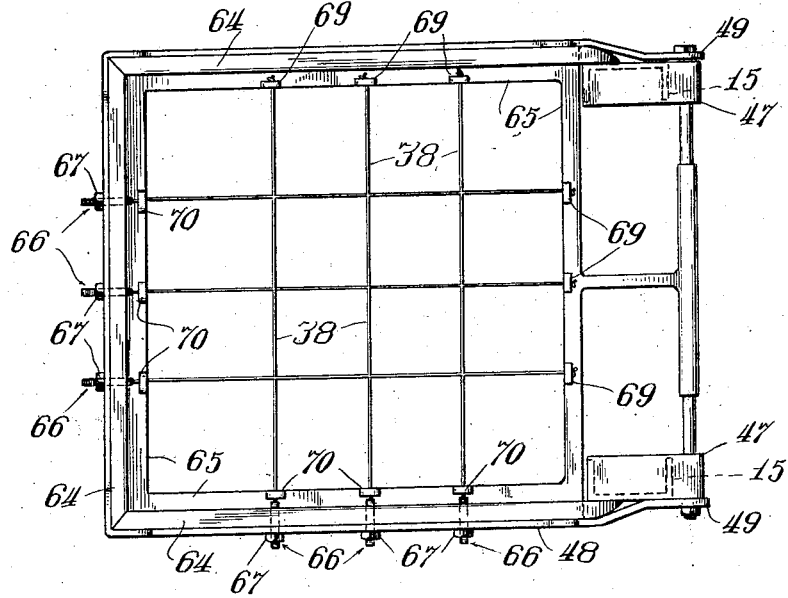
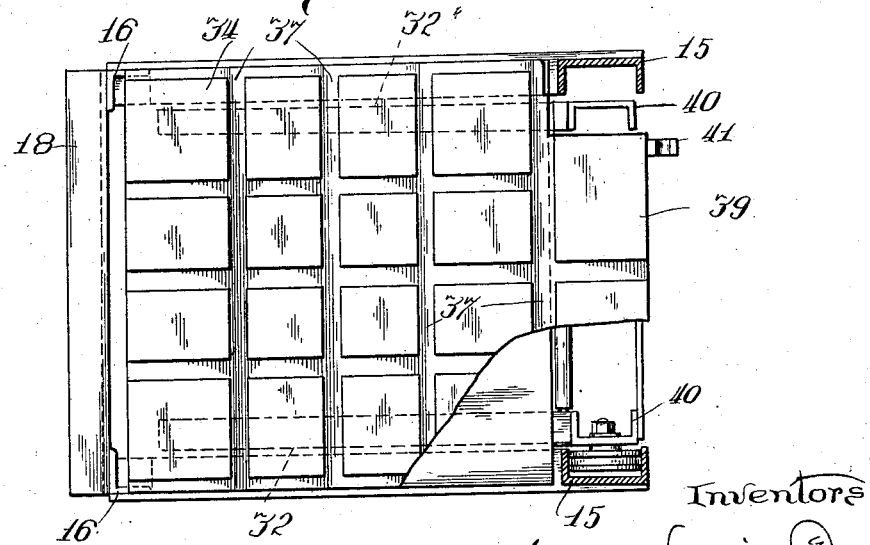

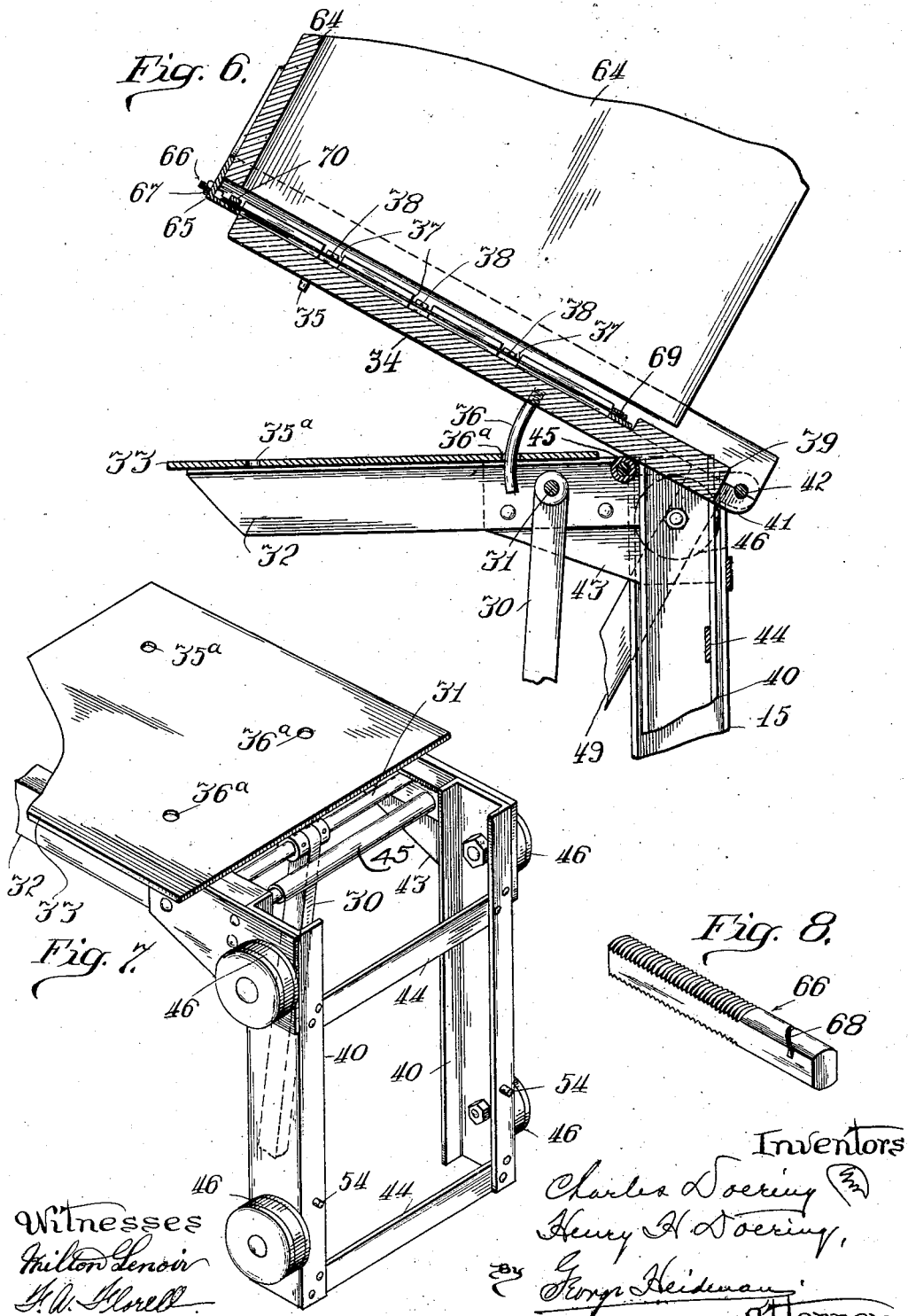

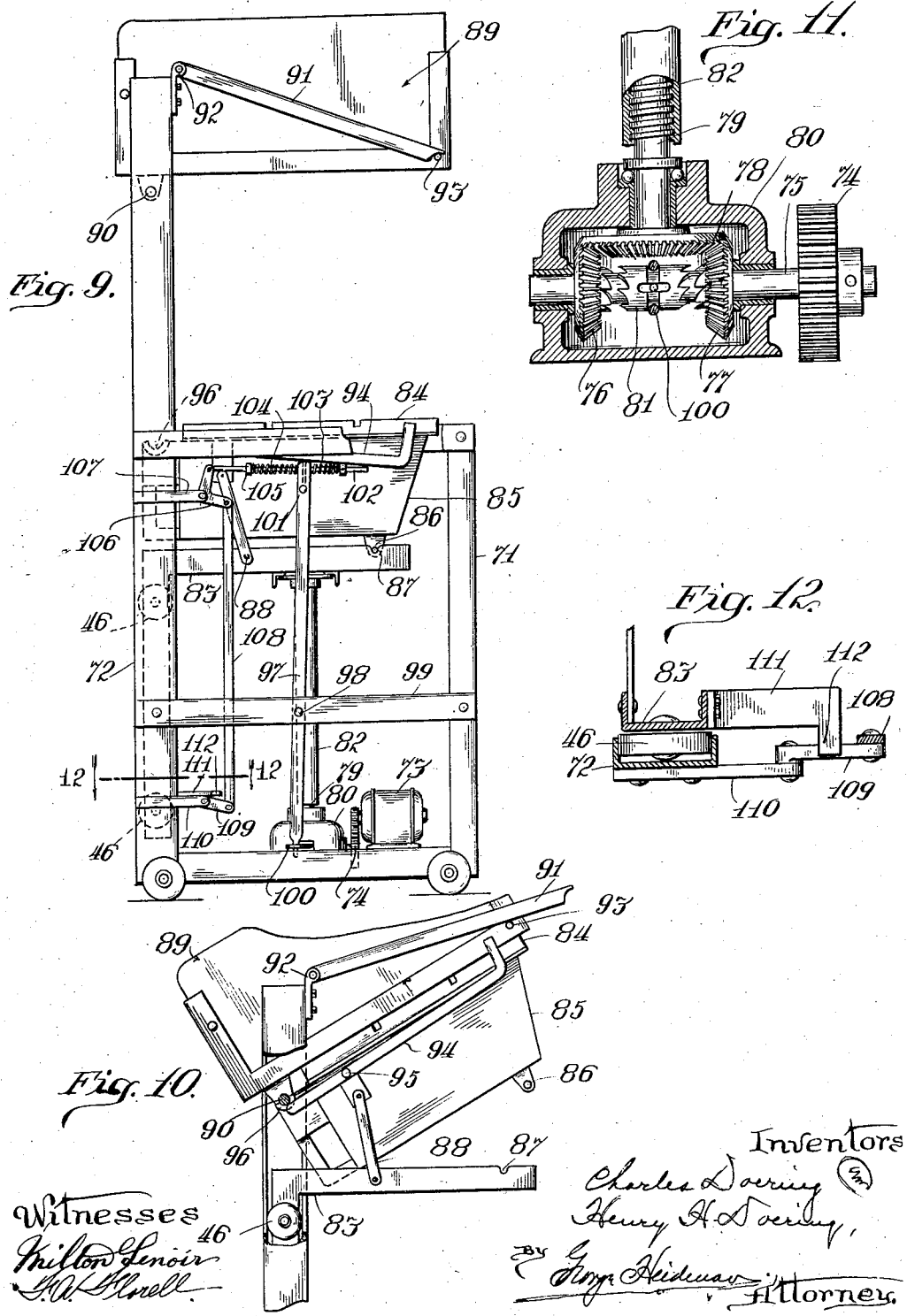

Patented June 3, 1930

1,761,010

UNITED STATES PATENT OFFICE

CHARLES DOERING AND HENRY H. DOERING, OF CHICAGO, ILLINOIS

BUTTER-CUTTING MACHINE

Application filed April 29, 1926. Serial No. 105,428.

Our invention relates to a machine especially adapted for cutting tub butter or large masses of butter into small portions or pieces preparatory to the introduction of the cut butter into a butter print forming machine. That is to say, our invention relates to a machine whereby the mass of butter after being emptied or removed from the firkin or tub will be automatically and the entire mass simultaneously cut into a plurality of smaller portions of a size capable of being readily introduced into the hopper of a print forming machine.

In order to feed the tub butter into a print forming machine, it is necessary to first cut the butter into smaller pieces, which has heretofore been manually performed. Such manual operation not only involves considerable time and labor, but also produces a less sanitary condition than is the case with our improved machine where the cutting operation as well as the operation of finally discharging the cut butter or butter portions into the hopper of a print forming machine, or onto a conveyor leading to such print forming machine, is mechanically performed.

The objects and advantages of our invention will be more thoroughly comprehended from the detailed description of the accompanying drawing wherein:—

Figure 2 is a front elevation of the machine with the upper portion broken away.

Figure 3 is a detail view of a portion of the main frame and elevating frame, illustrating the locking mechanism for the tilting cutter mechanism.

Figure 4 is a cross section taken substantially on the line 4—4 of Figure 1, showing a plan of the tilting cutter mechanism.

Figure 5 is a cross section taken on the line 5—5 of Figure 1 and showing a plan of the butter holding table.

Figure 6 is a detail vertical sectional view of the table portion and butter cutting mechanism, showing the table in elevated position and the butter cutter mechanism in tilted or dumping position.

Figure 7 is a detail perspective view of the elevating table and lifting frame portion of the machine illustrated in Figure 6, with the butter holding table and cutter mechanism omitted.

Figure 8 is a detail view in perspective of a cutter wire holding member.

Figure 9 is a side elevation, illustrating a modified form of the invention.

Figure 10 is a side view, with portions broken away, of the upper end of the machine in tilted or delivering position.

Figure 11 is a detail sectional view of the driving mechanism.

Figure 12 is a detail sectional view, taken on the line 12—12 of Figure 9 looking in the direction of the arrows.

Figure 1:
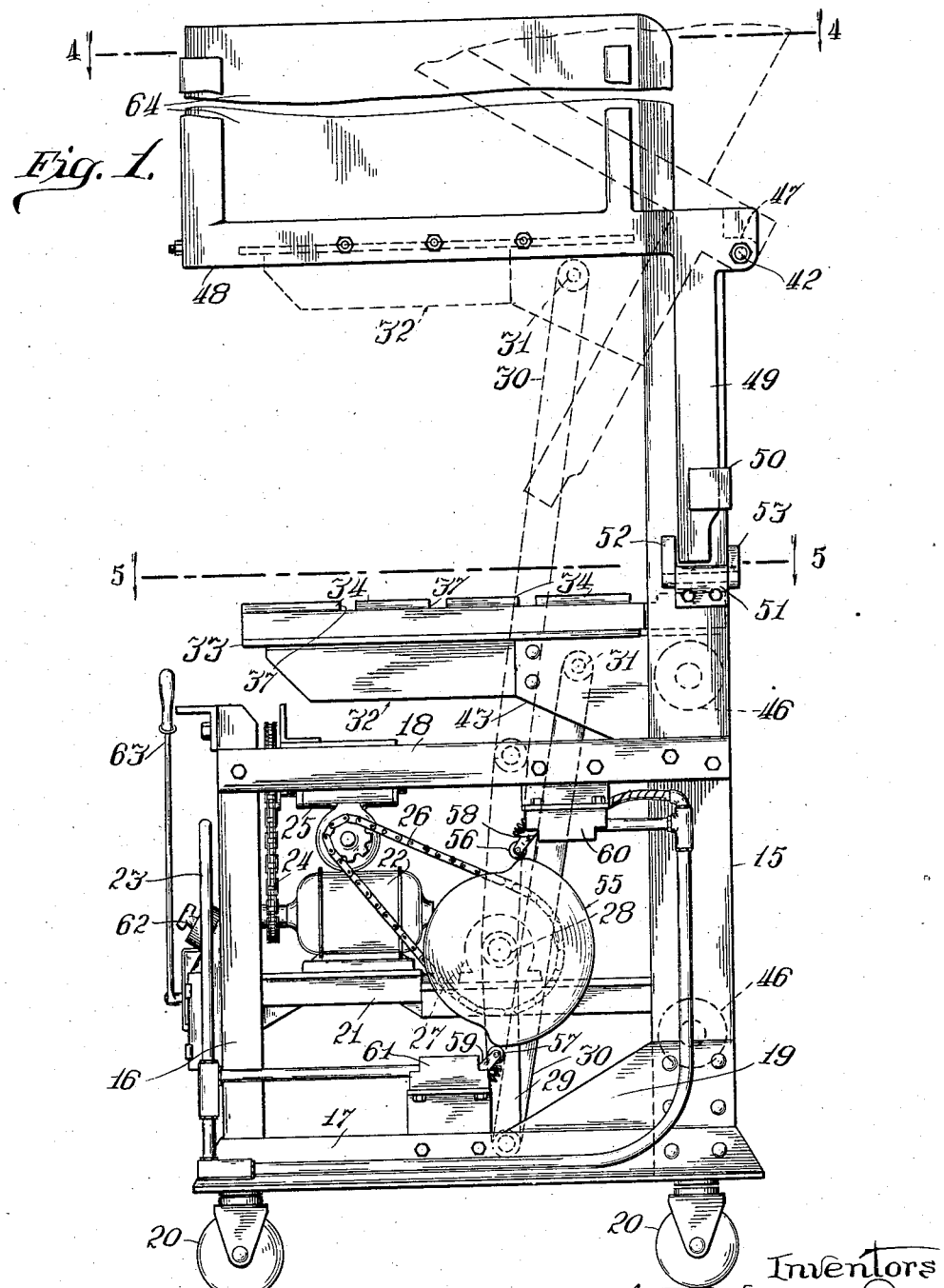
Figure 1 is a side elevation of our improved machine, with certain portions broken away, the elevated position of the elevating table being indicated in dotted lines.

Our improved machine, as exemplified in the drawings, is preferably of a portable type and comprises suitable vertical frame members 15, 16 preferably metal channel members or sections at the rear or discharging side and angle sections at the forward side, and suitable transverse or horizontally disposed frame members 17 and 18; with certain corners of the frame of the machine shown reenforced by suitable gussets or plates 19. The frame is shown preferably provided with suitable castors or wheels 20. The machine is provided with a platform or cross-members as at 21 to support an electric motor shown at 22 which provides the motive power for operating the entire machine; suitable conduits for the conductors or wires being shown at 23. The armature shaft of the motor 22 is shown provided with a sprocket chain 24, which drives suitable worm gearing in the housing 25; with the worm gear shaft in the bottom of the housing being provided on its outer end with a sprocket which drives sprocket chain 26. The sprocket chain in turn drives suitable reduction gearing mounted in the housing shown in dotted lines at 27 in Figure 1.

The shaft 28 of the reduction gearing in housing 27 is provided with a crank-arm 29 to which is pivotally connected a link 30, the upper end whereof is fulcrumed on crossbar 31 of a vertically movable table frame 32 provided with a top plate 33, see Figure 7, and which in turn supports a butter holding member or board 34. The bottom of the butter holding board 34 is shown provided with depending projections or pins as at 35 and 36 which are adapted to fit into guide holes 35ª and 36ª in the table top 33; the guide pins or rods 36, adjacent to what may be termed the rear side of the machine, being preferably slightly arcuate as shown so as to slide in the opening 36ª and permit the butter receiving member or holding board 34 to tilt into the position shown in Figure 6 when the vertically movable table 32 has reached a proper elevation. The butter holding member 34 preferably consists of a wood block or board provided with a number of suitably spaced intersecting grooves 37 adapted to register with the cutting wires 38 of the cutter mechanism which, in the specific exemplification, is mounted thereabove. The butter holding member or board 34 has the rearwardly extending portions 39 adapted to extend intermediate of the supporting frame members 15, (as indicated in dotted lines in Figure 1 and shown in full lines in Figure 6) as well as between the vertically movable frame members 40; and the rear end of the board 34 is shown provided with a pair of projecting lugs 41 which are adapted to engage beneath a rod 42 secured at the upper end of the main frame and which provides the pivot point for the rear end of the cutter mechanism to be described.

The side frame members of the lifting or traveling table 32, at the rear ends, are shown secured by means of gussets 43 to the movable frame members 40 which are adapted to travel vertically intermediate of the main frame members 15; the frame members 40 being suitably braced and connected together by straps 44, 44, see Figure 7; and at the upper end the elevating or traveling table is preferably provided with a roller 45 which engages with the under side of the butter holding board 34 and allows the latter, with the cutter mechanism, to slide slightly toward the rear of the machine when in the tilted position shown in Figure 6. The outer sides of the lifting frame 40 are shown provided with suitable rollers as at 46 which are adapted to ride vertically in the channel frame member 15 as shown in Figure 5, and thus also maintaining the lifting frame 40 in proper position.

The upper ends of the frame member 15 are shown provided with the portions 47 extending rearward of vertical plane of travel of the movable frame 40, to receive the rod 42 which extends through the side frame members 48 of the cutter mechanism and provides a fulcrum for the cutter mechanism so as to permit the latter, with the butter holding board 34 to tilt into the position indicated in Figure 6.

The frame members 48 of the cutter mechanism are provided with the depending arms 49 (one on each side of the machine) adapted to extend parallel with the outer faces of the main frame members 15, which latter are shown provided with lugs 50 with which the arms 49 engage to maintain the cutter mechanism in the normal horizontal position shown in Figure 1.

The sides of the frame members 15 are each provided with a tilting latch element pivotally secured in place by a suitable bracket 51, see Figure 1. The tilting latch element comprises a pin portion rotatable in the bracket 51, one end whereof has an arm 52 which normally is disposed in the path of the depending arm 49 as shown in Figures 1 and 3. The tilting latch element also is provided with an arm 53 disposed at the rear side of the machine transversely of the elevating frame 40; and the latter is provided at suitable points with pins 54, see Figures 3 and 7, each adapted to engage the long arm 53 of the respective tilting latch element when the elevating table moves upwardly. As is evident from the construction shown, upward movement of the tilting frame 40 causes the pins 54 to engage the arms 53 moving the latter into the inclined position shown in dotted lines in Figure 3 which causes the other arm of the latch element to tilt into the position shown in dotted lines, Figure 3, namely out of the path of the depending arms 49. With the latch elements in the dotted line position shown in Figure 3, it is apparent that the cutter frame may now be tilted about the fulcrum point or rod 42 into the position indicated in Figure 6.

The shaft 28 of the reduction gearing is shown provided with a cam plate or disc 55 see Figure 1, the enlarged or cam portion whereof is adapted to engage the small rollers 56 and 57 of the spring controlled switches 58 and 59, respectively, enclosed in the housings 60 and 61 for controlling the circuit of the motor 22. The rotary cam 55 is so formed relative to the rollers of the switch members 58 and 59 that one of the switches will be in closed position, through the action of its spring, while the other switch will be in open position because of the cam surface contacting with the roller of the switch member and pressing the same against the action of its spring.

The circular cam plate 55 is enlarged throughout approximately one-half its circumference and in Figure 1 the cam is shown entering into engagement with the roller 57 of switch 59, so that the latter is open, while roller 56 of the upper switch 58 is moving out of engagement with the cam plate 55 and the table 32 has about reached its normal position. With this condition, current is passing through switch 59 and the armature of the motor is caused to rotate in a direction which will induce the intermediate driving mechanism to rotate crank-shaft 28 in a direction which will move crank-arm 29 from the full line position to the dotted line position shown in Figure 1, namely so as to elevate the table 32 with the butter receiving top or board 34 into the dotted line position in Figure 1 and finally into the butter board and cutter tilting position induced when the pivotal points of the link 30 with the table and the crank arm 29 are on dead center with the crank shaft 28. Momentarily in advance of the dead center relation referred to, the pins 54 carried by the elevating slide frame 40 will have been brought into engagement with the arms 53 of the latch member 52, so that the latter will be out of the path of the depending arms 49, thereby allowing the cutter frame 48 to tilt about pivotal point or rod 42 induced by the further upward pressure exerted by link 30 when the crank arm comes into complete alignment. The arms 53 of the latches are of such length that the pins 54 will be in contact therewith and therefore hold the latches 52 in the unlatching position shown in dotted lines in Figure 3.

Cam plate 55 being rotated with the crank shaft 28 will now be positioned where the cam surface, shown in contact with switch 59, will engage with the switch 58 and open the same while switch 59 will be disengaged and allowed to close through the action of its spring. This provides a circuit to be formed which induces the motor shaft to rotate in the opposite direction; assuming, of course, that the main current control switch 62 is closed and the main switch control lever 63 has been properly operated or set so as to permit current to flow into the circuit controlled by the switches 58 and 59.

The purpose of our machine is to cut the large mass of butter, which has been emptied from the firkins or tub onto table 34, into suitable smaller pieces or chunks which can be readily introduced into the hopper of a butter print forming machine. This has heretofore been done manually and the cut pieces then thrown into the hopper of the print machine by hand. With our machine the tub, which is usually lined with waxed paper, is inverted on the table 34 while the latter is in its normal unelevated position and the tub removed, leaving the large tank-shaped mass resting on the table 34. Switch lever 63 is then moved so as to turn the current into the circuit of the machine causing the motor to be set in operation, thereby inducing elevation of the composite table 32—34 with the butter mass. The butter is therefore forced up against the cutting wires 38, which causes the butter to be cut into a plurality of rectangular portions suitable for introduction into the hopper of a butter print machine.

The cutter frame is provided with the three side walls 64, at the front and the two sides, while the back of the cutter box or chamber is open so that when the cutter frame or box is tilted into the position shown in Figure 6, the butter will discharge into the hopper or trough of the print machine (which may be positioned at the rear of our improved cutting machine) or into suitable receptacles.

In order to permit the cutting wires to pass through the entire mass of butter, the butter holding table or board 34 is shown provided with the comparatively deep grooves 37 at points registering with the wires when the table 34 has been forced up against the bottom of the cutter frame and at which time the lugs 41 have been brought up against the rod 42, causing the table 34 to tilt upwardly at the front end and it in turn causing the cutter frame to tilt likewise and dumping the cut butter as previously described.

The cutter mechanism comprises a suitable rectangular frame (preferably metal) 65 having openings to receive the threaded wire holding members 66 (shown in detail in Figure 8) and adapted to be held in adjusted position by nuts 67 which also engage the outer side of the frame 65. The members 66 are each provided at one end with a somewhat diagonally arranged slot 68 to receive one end of a cutting wire 38; while the other end of the wire may be secured in suitable lugs 69 formed on the opposite side of the frame as shown in Figure 4.

In order to prevent upward movement or bending of the cutting wires and to reenforce them, we show the frame 65 provided with lugs 70 slotted at one end for passage of the wire therethrough; that is to say, the lugs 70 lap over the wires as shown in Figure 4.

In practice, it will be understood that the lower part of the machine is preferably provided with enclosing side walls, (not shown) as is also the rear side of the machine, so as to enclose the motor and gearing to prevent injury to the operator.

In Figure 9 we show a modified form of the invention in so far as the operating or driving mechanism is concerned; the general construction of the lifting table and the butter cutting and delivering mechanism being the same.

The construction, like that in Figure 1, comprises supporting frame members 71 and 72, having suitable supporting cross-members as their bottoms for an electric motor 73, the armature shaft whereof is shown geared to gear 74 secured on the shaft 75 of the main driving mechanism. The shaft 75 is provided with the spaced bevel gears 76, 77 loosely mounted thereon and both in constant mesh with bevel gear 78 secured to the lower end of a screw-shaft 79. The gears and shafts just mentioned are mounted in a suitable housing 80 supported on the bottom cross-members of the supporting frame.

Slidably keyed on shaft 75 intermediate of gears 76, 77 is a clutch sleeve 81 adapted to alternately establish operative connection between shaft 75 and the gears 76, 77, so as to rotate screw-shaft 79 in the desired direction.

The screw-shaft 79 is provided with an elongated screw-sleeve 82, the upper end whereof is secured to the lower side of the horizontally disposed portion of an elevating or lifting frame 83; the vertically disposed portions of the frame being slidable in the standards or uprights 72 which are preferably of channel formation and receive the rollers 46 like in the construction previously described.

The lifting frame 83 supports a butter holding table 84 having a depending portion 85, one end whereof is shown provided with a depending lug and pin at 86, whereby the free end of the table is supported; the pin being adapted to extend into the slot 87 of the elevating or lifting frame 83. The butter-holding table 84, adjacent to the opposite end, is pivotally secured to the lifting frame 83 by the link 88 so arranged that the butter-holding table may tilt into the position shown in Figure 10; this operation and position being accomplished and attained when the lifting frame and butter-holding table reach the maximum point of upward travel.

The upper end of the frame members 72 is provided with the hingedly supported cutter frame or portion 89, substantially similar to that previously described and pivotally mounted at 90 to the main supporting members 72 so as to permit the cutter frame to tilt into the position shown in Figure 10 when the butter-holding table 84, through proper elevation of lifting frame 83, is forced upwardly beneath the cutter frame.

In order that the cutter frame may not begin to tilt when the butter carried by table 84 engages the bottom of the cutting wires, we provide a latch member 91, hingedly secured to the upright or standard 72 at 92, while the free end is formed to have holding engagement with a pin 93 on the side of the cutter frame 89. The latch member 91 will prevent tilting of the cutter frame until the member 91 is forced upwardly out of engagement, as shown in Figure 10, through the action of a tripper bar 94, pivotally secured at 95 to the frame of the butter-holding table 84; the short end of the bar being intended to engage the pivot rod 90 after the table has reached the maximum of its direct upward travel, namely after the butter has been entirely forced through the cutting mechanism or wires carried by frame 89 and the butter is ready for delivery from the machine, at which time the socketed extension 96 of the butter-holding table frame 84 will engage beneath the pivot-forming rod 90. With extension 96 in engagement with the rod 90, it is apparent that further upward travel of the elevating frame 83 will induce the tilting of the tiltable elements into the position shown in Figure 10.

The clutch 81 is controlled by the lever 97 pivoted at 98 to a cross-member 99 of the main frame of the machine, while the lower end controls a shift-fork 100 (or other suitable means) for shifting clutch 81 from its neutral position shown in Figure 11, into mesh with either bevel gear 76 or 77, depending upon direction of oscillation of lever 97. The upper end of the lever 97 is shown provided with a small pin or hand-grasp at 101 whereby to initially control and to induce clutching operations.

The upper end of lever 97 is apertured for passage of a rod 102, provided with coiled springs 103, 104 arranged on opposite sides of lever 97 and in pressing relation therewith; the springs being maintained in substantially equal pressing relation with the lever 97 by the collars 105.

The end of rod 102 is pivotally secured to one arm of bell-crank lever 106 pivotally mounted on an extension 107 secured to the main frame of the machine. The other arm of bell-crank lever 106 is pivotally connected to a rod or link 108, the lower end whereof is pivotally connected to a short link 109 carried by bracket 110 secured to the main frame member 72. Secured to the lower portion of the lifting or elevating frame 83, is a striker arm 111 having an off-set end or projection 112 disposed into the path of arm 109 as well into that of bell-crank lever 106.

In operation, when the table has been provided with the mass of butter intended to be cut, the lever 97 is oscillated so as to shift clutch-sleeve 81 into mesh with the proper gear, for example gear 77, causing gear 78 to be rotated in a direction which causes sleeve 82 to ride upwardly on the screw-shaft 79 to which gear 78 is secured. The springs 103 and 104 are normally so arranged as not to exert an appreciable pressure on the upper end of the lever 97, in order that the clutch mechanism will remain in mesh. When the elevating frame 83, with the butter-carrying table, reaches an elevated point where arm 111 with its finger 112 engages beneath bell-crank lever 106, rod 102 will be drawn to the left in Figure 9, spring 103 being put under pressure and yieldingly forcing the upper end of lever 97 to the left in Figure 9 and thus causing clutch sleeve 81 to move out of engagement with gear 77 thereby stopping further upward movement of the lifting table 83. The tripping mechanism just referred to take effect momentarily subsequent to the engagement of socketed extension 96 with the pivot rod 90 with the result that the butter-holding table or board 84 with the cutting mechanism 89 is tilted into the delivering position shown in Figure 10; it being understood that the cutting mechanism 89 is open at the left hand side of the machine as illustrated in Figures 9 and 10; that is to say the cutting mechanism in that respect is similar to that shown in the previous figures.

It is apparent that the mass of butter carried on the table, in both constructions illustrated, is forced upwardly into the cutting mechanism so that the cutting wires 38 arranged in the bottom of the cutting mechanism will cut the mass of butter into a predetermined number of smaller portions of desired size; premature tilting of the cutting mechanism into delivering position in the one instance beng prevented by latch member 52 in the construction shown in Figure 1 and by the latch member 91 in the construction shown in Figure 9.

We have illustrated the various forms of our improved cutting machine operated by means of electric motors, but it is apparent that any suitable motive power may be employed involving mechanism for controlling the application of the motive power and that other modifications may be made without, however, departing from the spirit of our invention.

What we claim is:

1. A butter cutting machine, comprising a reciprocating butter holding table, butter cutting mechanism tiltably mounted above said table, means whereby said table is reciprocated toward and away from said cutting mechanism, and means whereby said cutting mechanism is tilted into butter delivering position.

2. A butter cutting machine, comprising a reciprocating frame, a butter holding table on said frame, cutting mechanism mounted in the path of said reciprocating frame and table, and means whereby said table and cutting mechanism are tilted into butter delivering position after said frame reaches a predetermined point in its reciprocation.

3. A butter cutting machine, comprising a reciprocating frame, power means for reciprocating said frame, means for controlling the direction of reciprocation, a butter holding table mounted on said frame, butter cutting mechanism mounted in the path of said reciprocating frame and table, means whereby the butter holding table and cutter mechanism are tilted into butter delivering position, and means for automatically controlling said direction controlling means when the reciprocating frame reaches predetermined points in its reciprocation.

4. A machine of the character described, comprising a main frame, cutter mechanism tiltably mounted at the upper end of said main frame, a butter holding table reciprocatingly mounted in said main frame beneath the cutter mechanism, means whereby said table is forced upwardly against the bottom of said cutter mechanism and the butter thereby cut into a plurality of portions, and means automatically actuated whereby the cutter mechanism is tilted and the cut butter discharged therefrom.

5. A machine of the character described, comprising a main frame, a frame reciprocatingly mounted in said main frame, a butter holding member carried by said reciprocating frame, cutter mechanism disposed across the path of said butter holding member and pivotally secured to the main frame, means for locking said cutter mechanism against movement, means carried by said reciprocating frame for releasing said first mentioned means from locking position, and means whereby said reciprocating frame and butter holding member are moved toward and away from said cutter mechanism.

6. A butter cutting machine, comprising a main frame, cutting mechanism tiltably mounted at the upper end of the main frame so as to tilt into an inclining position, means for normally locking said mechanism against tilting movement, a frame reciprocatingly mounted in the main frame and provided with a butter holding table loosely mounted thereon, means whereby said frame and butter holding table may be moved upwardly against the lower side of the cutting mechanism and the superposed butter forced through the mechanism and divided into a plurality of portions and tilting of the cutting mechanism and butter holding table into dumping position induced, and means actuated by said reciprocating frame whereby said first mentioned means are actuated and the cutting mechanism is released at a predetermined moment in the upward travel of said reciprocating frame.

7. A machine of the character described, comprising a main frame, a table reciprocatingly mounted in said frame and provided with a loosely mounted butter holding top, a frame pivotally mounted above said table and provided with a plurality of cutting wires arranged transversely thereof, means for normally locking said frame, means whereby said table is alternately moved toward and away from said cutting frame, and means actuated by said reciprocating table when the latter reaches a predetermined point in its travel whereby said first means is actuated and the cutting frame is released and said cutting frame with the loosely mounted top caused to tilt into dumping position.

8. A machine of the character described, comprising a main frame, a table reciprocatingly mounted in said main frame so as to move upwardly, a butter holding top loosely mounted on said table, a wire holding frame pivotally mounted on said main frame above said reciprocating table, means whereby said cutting frame is locked against movement, means carried by said reciprocating table whereby said first means is moved into unlocking position, the butter holding top being provided with recesses or grooves adapted to register with the cutting wires when the table has been reciprocated upwardly against the bottom of said wire holding frame.

9. A machine of the character described, comprising a main frame, a second frame reciprocatingly mounted in the main frame to travel vertically, a butter holding top carried by said reciprocating frame, a cutter frame pivotally mounted in the path of the second frame, mechanism operatively connected with the second frame for reciprocating said second frame, tripper mechanism adapted to be actuated when the second frame approaches the limits of reciprocation and operatively connected with said first mechanism for controlling the direction of reciprocation of said second frame, means whereby the cutter frame is normally locked in place, and means carried by the second frame whereby said first means are moved out of locking position at a predetermined moment in the travel of the reciprocating frame and the cutting frame with the butter holding top caused to tilt into dumping position.

10. In a butter cutting machine, a butter-supporting platen, a head having a cutter element, means to move said platen relative to said head, and means to cause tilting of said platen and said head after said parts have engaged.

11. In a butter cutting machine, a supporting frame, a butter-supporting platen carried by said frame, a head having a cutter element above said platen, means for pivoting one end of said head to said supporting frame, means for causing relative movement of said platen and head toward each other, and means including parts on said supporting frame and platen engageable with each other for causing said platen and cutter head to tilt sufficiently to discharge the butter therefrom.

12. In a butter cutting machine, a supporting frame, a butter-supporting platen carried by said frame, a head having a cutter element above said platen, means for causing relative movement of said platen and cutter head toward each other, and means actuated by said first means for causing said platen to discharge the butter therefrom.

13. In a butter cutting machine, a supporting frame, a butter-supporting platen carried by said frame, a head having a cutter element, means for moving said platen relative to said cutter head for cutting the butter, and means whereby said platen is tilted when it reaches a predetermined point in its movement and the butter discharged therefrom.

14. In a butter cutting machine, a supporting frame, a head having a cutter element, means for releasably securing said cutter head to said supporting frame, a butter-supporting platen, and means for moving said platen and cutter head relatively to each other, said platen releasing said securing means to permit movement of said cutter head relative to said supporting frame when said platen and cutter frame are brought into engagement.

15. In a butter cutting machine, a platen, a cutter head, means to cause relative movement of said platen and cutter head toward each other, a latch for normally holding said head against movement, and means to release said latch during the relative movement of said platen and cutter head.

16. In a butter cutting machine, a platen, a cutter head, means for moving said platen and cutter head relatively to each other, a latch for normally holding said cutter head against movement, and means to release said latch when said platen and cutter head are moved into engagement.

17. In a butter cutting machine, a butter-supporting platen, a cutter head, a support to which said cutter head is pivoted, means for releasably securing said cutter head to said support, means for causing said platen and head to move relatively to each other, and means for releasing said securing means when said platen and cutter head are engaged whereby said cutter head may be swung on its pivot thereby to discharge butter.

18. In a butter cutting machine, a butter-supporting platen, a cutter head, a support to which said cutter head is pivoted, means for raising said platen to said cutter head, means for securing said cutter head against movement, means for releasing said securing means upon engagement of said platen and head, and means for causing said head and platen concomitantly to tilt thereby to discharge the butter.

19. In a butter cutting machine, a butter-supporting platen, a cutter head above said platen, means for elevating said platen to said head, and means for tilting said head and platen after said parts have engaged thereby to discharge butter therefrom.

CHARLES DOERING.
HENRY H. DOERING.